United States Patent [19]

Gajski et al.

[11] 4,064,421
[45] Dec. 20, 1977

[54] HIGH SPEED MODULAR ARITHMETIC APPARATUS HAVING A MASK GENERATOR AND A PRIORITY ENCODER

[75] Inventors: Daniel Danko Gajski, Philadelphia; Bhalchandra Ramchandra Tulpule, Frazer; Chandrakant Ratilal Vora, Audubon, all of Pa.

[73] Assignee: Burroughs Corporation, Detroit, Mich.

[21] Appl. No.: 707,603

[22] Filed: July 22, 1976

[51] Int. Cl.² .................................................. G06F 7/38
[52] U.S. Cl. .............................. 364/716; 235/92 CM; 364/715; 364/746
[58] Field of Search ............... 235/156, 159, 160, 164, 235/154, 92 CM; 340/347 DD

[56] References Cited

U.S. PATENT DOCUMENTS 3,914,590  10/1975  Irwin et al. ......................... 235/164

OTHER PUBLICATIONS

H. L. Garner, "The Residue Number System," IRE Trans. on Electronic Computers, June 1959, pp. 140–147.

*Primary Examiner*—David H. Malzahn
*Attorney, Agent, or Firm*—Edward J. Feeney, Jr.; Edmund M. Chung; Leonard C. Brenner

[57] ABSTRACT

In a high speed arithmetic apparatus, the tally coded output of a modular mask generator addressed by a binary first operand and the tally coded input of a priority encoder are joined together by an interconnecting apparatus. The interconnecting apparatus is responsive in form to a second operand and to a selected arithmetic operation to provide at the output of the priority encoder the binary resultant of the selected operation executed upon the first and second operands. The interconnecting apparatus is disclosed in its simplest embodiment as fixed hardwired connections and in its most sophisticated embodiment as a dynamically microprogrammable full crossbar network.

6 Claims, 9 Drawing Figures

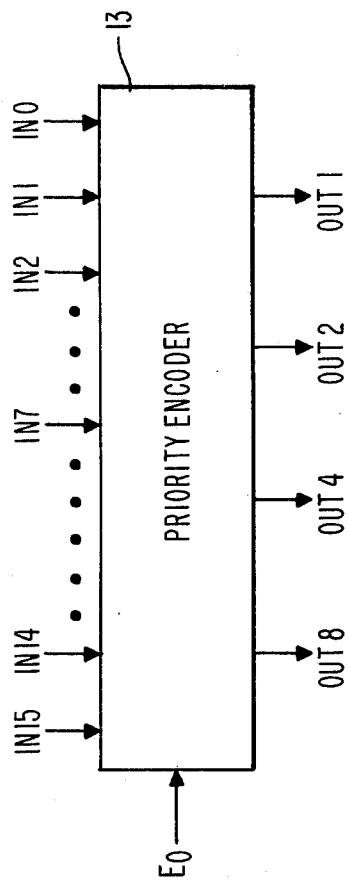

HIGH SPEED MODULAR ARITHMETIC APPARATUS HAVING A MASK GENERATOR AND A PRIORITY ENCODER

CROSS REFERENCE TO RELATED APPLICATION

In copending application, Ser. No. 618,269, now U.S. Pat. No. 4,012,722 for "A HIGH SPEED MODULAR MASK GENERATOR" filed Sept. 30, 1975, in the names of D. D. Gajski and B. R. Tulpule and assigned to the assignee of the present invention there is described and claimed a specific high speed modular apparatus for converting binary code into tally code. Although not limited thereto, the present employs in its preferred embodiment such an apparatus.

BACKGROUND; OBJECTS OF THE INVENTION

In high speed digital data processing systems the need for apparatus to perform high speed arithmetic operations has become more and more paramount. In particular, certain operations such as division have in the past required relatively long execution times. Further, as data processing systems become increasingly modular, the desirability for modularized arithmetic apparatus has ripened. For universal utility, an arithmetic apparatus should be physically realizable by small, medium, and large scale integration processes.

Therefore it is an object of the present invention to provide a high speed arithmetic apparatus.

It is another object of the invention to provide a high speed arithmetic apparatus particular adapted to perform high speed division operations.

It is yet another object of the invention to provide a high speed arithmetic apparatus suitable for small, medium, and high speed operations.

SUMMARY OF THE INVENTION

The improved high speed arithmetic apparatus of the present invention achieves the above and other objects and purposes of the invention by providing a modular high speed mask generator to convert a binary first operand into a tally coded operand, a modular high speed priority encoder to convert a tally coded input into a binary coded output, and interconnecting apparatus responsive in form to a second operand and to a selected arithmetic operation, the interconnecting apparatus joining the output of the mask generator with the input of the priority encoder to generate at the output of the encoder the binary resultant of the selected operation upon the first and second operands.

BRIEF DESCRIPTION OF THE DRAWINGS

Other objects, features and advantages of this invention will be readily apparent and better understood by reference to the following detailed description when considered in conjunction with the appended claims and the accompanying drawings in which:

FIG. 2A is a block diagram of a priority encoder used in the high speed modular arithmetic apparatus of the present invention;

FIG. 2B is a logic table depicting the function of the priority encoder of FIG. 2A;

DETAILED DESCRIPTION OF THE INVENTION

The arithmetic apparatus of the present invention involves the utilization and interconnecting of a mask generator and a priority encoder to perform various specified arithmetic operations. In order to facilitate an understanding of the invention, a description of the mask generator will be presented and followed by a description of the priority encoder and by a description detailing the interconnecting of a mask generator and priority encoder to perform useful arithmetic operations. Finally, two examples will be detailed showing the present invention used in positive difference and division operations.

Figures 1A, 1B:
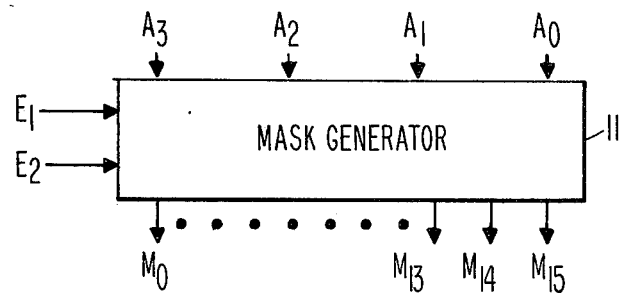
FIG. 1A is a block diagram of a mask generator used in the high speed modular arithmetic apparatus of the present invention.
FIG. 1B is a logic table depicting the function of the mask generator of FIG. 1A.

Referring to FIG. 1A, the mask generator 11 of the present invention includes a plurality of input address lines, a plurality of output masking lines, a first control line E1, and a second control line E2. The input address lines receive, in parallel, binary numerical data with input address line A0 receiving the least significant bit, address line A1 receiving the next least significant bit, address line A2 receiving the second most significant bit, and input address line A3 receiving the most significant address bit. As will be detailed hereinafter, mask generators may be fabricated with more or fewer input address lines. The mask generator 11 also includes a plurality of output masking lines referenced M0 through M15 consecutively. The number of output lines for a given mask generator 11 is equal to two (2) raised in power to the number of input address lines. Thus, in FIG. 1A, there are four input address lines A0 through A3 and 16 output masking lines M0 through M15.

The logic levels appearing on the output masking lines M0 through M15 depends upon the binary numerical data present on the input address lines A0 through A3 and the logic levels on the first and second control lines E1 and E2, see FIG. 1B. Note that the output lines of the Mask Generator 11 are labelled from M0 to M15 left-to-right rather than from M15 left-to-right rather than from M15 to M0 left-to-right as in patent application Ser. No. 618,269 for "A HIGH SPEED MODULAR MASK GENERATOR", filed Sept. 30, 1975 and issued Mar. 15, 1977 as U.S. Pat. No. 4,012,722. The difference in output labelling does not affect the design or function of the Mask Generator 11 but it does facilitate explanation of the Mask Generator 11 as it relates to other elements as will be seen hereinafter. When both E1 and E2 are at logical zero the output masking lines M0 through M15 are also at logical zero regardless of the binary numerical data present at the input address lines A0 through A3. Likewise, when both E1 and E2 are at a logical one level the output masking lines M0 through M15 are all at a logical one level regardless of the binary numerical data present on the input address lines A0 through A3. With a logical zero level on the first control lines E1 and a logical one level present on the second control line E2, the logic levels on the output masking lines M0 through M15 are a function of the binary numerical data present at the input address lines A0 through A3. When the input binary numerical data is zero, a logical one level is present on all output masking lines M0 through M15. A binary numerical value of one (a logical one on input address line A0 and a logical zero on input address lines A1 through A3) generates a logical one level on output masking lines M1 through M15 and a logical zero on output masking line M01. An input binary representation of two (A1 at one, and A0, A2, A3 at zero) generates a logical one level on output masking lines M2 through M15 and a logical zero level on output masking lines M0 and M1. This pattern is continued down through a binary representation of fifteen (a logical one level present on all input address lines A0 through A3) wherein a logical one level is present on output masking line M15 and a logical zero level is present on masking lines M0 through M14.

When the first control line E1 is at a logical one level and the second control line E2 is at a logical zero level, a binary representation of zero on the input address lines A0 through A3 generates all zeroes on output masking lines M0 through M15. An input binary address representation of one (1) generates a logical one on output masking line M0 and logical zero levels on output masking lines M1 through M15. A binary representation of two (2) at the input address lines A0 through A3 generates a logical one level on output masking lines M10 and M1 and a logical zero level on output masking lines M2 through M15. This pattern is continued down to the binary representation of fifteen (15) wherein output masking line M15 is at logical zero and output masking lines M0 through M14 are at logical one.

As mentioned, the mask generator 11 may be fabricated with more or less than the four input lines A0 through A3. However, since the number of output masking lines is equal to two (2) raised in power to the number of address input lines, the number of connection pins or terminals that would be required in an integrated circuit fabrication of a mask generator module 11 having six or more address lines would be rather excessive with regard to present day integrated circuit packaging technology. Therefore, mask generators 11 having between three and five input address lines are generally preferred for integrated circuit fabrication.

Referring now to FIG. 2A and 2B it can be seen that a Priority Encoder 13 is in function the left inverse of the Mask Generator 11. Thus, the Priority Encoder 13 computes the binary address of the first logical one in the masking output of the Mask Generator 11.

With continued reference to FIG. 2A, the Priority Encoder 13 of the present invention includes a plurality of input lines IN0 through IN15, a plurality of output lines OUT1 through OUT8, and a Control Line E0. The logical relationship between the inputs and outputs of the Priority Encoder 13 is shown in FIG. 2B. It is noted that the input lines identified as IN0 through IN15 could be labeled, if desired, in the reverse order thereby yielding a Priority Encoder which would be in function the right inverse of the Mask Generator 11 above-described rather than the preferred left inverse as shown and described.

Figure 3:
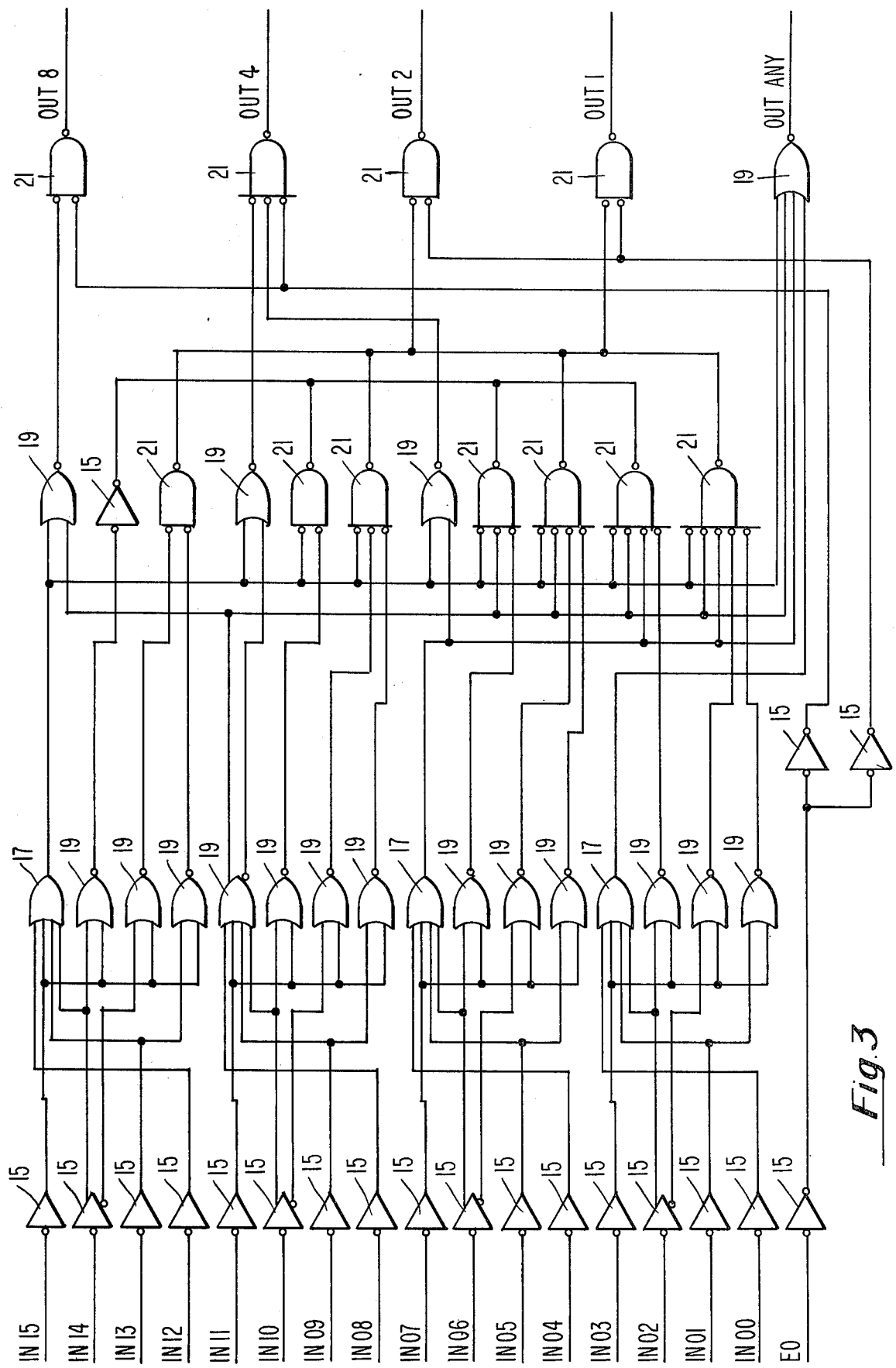
FIG. 3 is a logic diagram of the priority encoder of FIGS 2A and 2B.

The Priority Encoder 13 may be fabricated, see FIG. 3, from standard logic devices such as inverted input inverter buffers 15, OR gates 17, NOR gates 19, and inverted input NAND gates 21. FIG. 3 shows an output line labeled OUT ANY not previously described. The OUT ANY line outputs a logical ONE level when any input line IN0 through IN15 is at a logical ONE, regardless of the input level to the control line E0. Thus the OUT ANY line presents a logical ZERO only when all inputs IN0 through IN15 are at the logical ZERO level. The Priority Encoder 13 as realized, as shown in FIG. 3, employs negative logic. That is, a logical ONE is represented by a relatively low voltage level and logical ZERO is represented by a relatively high logic level. In other realizations of the Priority Encoder 13, positive logic embodiments may be employed if desired.

Figure 4:
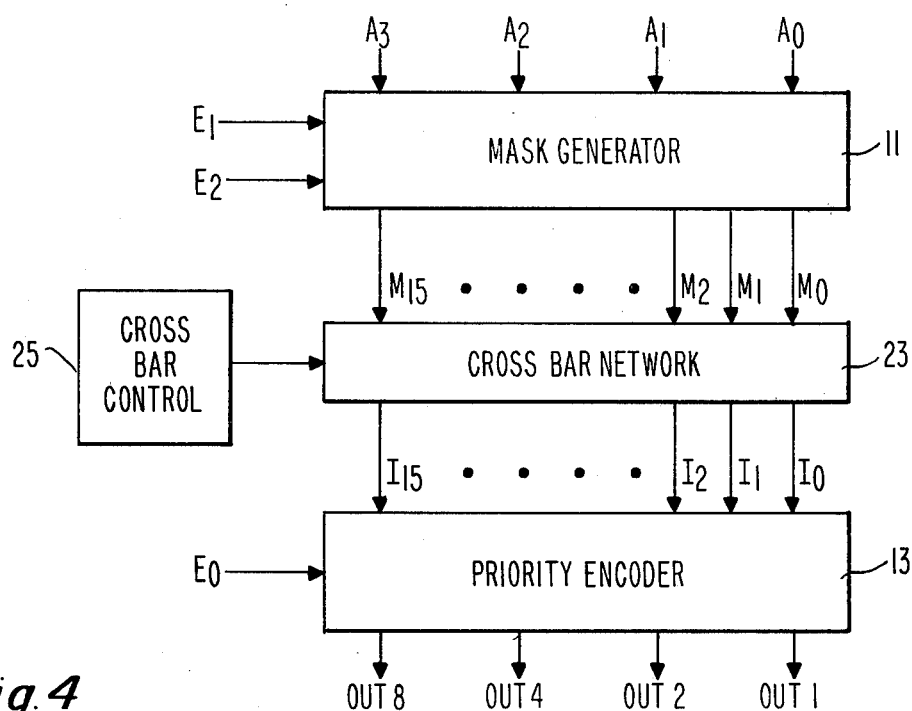
FIG. 4 is a block diagram of the high speed modular arithmetic apparatus of the present invention.

The Mask Generator 11 and the Priority Encoder 13 are interconnected to perform useful arithmetic operations, see FIG. 4. A crossbar network 23 interposes the masking output lines M0 through M15 of the Mask Generator 11 and the input lines IN0 through IN15 of the Priority Encoder 13. The crossbar network 23 comprises a parallel multiplexing system capable of interconnecting any output line from the Mask Generator 11 to any input line of the Priority Encoder 13.

In contrast to the time-division switching done on a common-bus system, the crossbar network technique used here is often referred to as space-division switching. Such switching technique is found commonly in most telephone central offices as well as in common commercial multiprocessing data processing systems such as the Burroughs Corporation's B5500, B6700, and B700. Further description of the crossbar technique may be found in a section entitled "Crossbar Switch Systems" beginning on page 32 of the text "Multiprocessors and Parallel Processing" edited by Philip H. Enslow, Jr. and published by John Wileg & Sons (1974). The crossbar network 23 is controlled by the crossbar control unit 25 which selects a particular pattern of interconnecting output lines of the Mask Generator 11 and input lines of the Priority Encoder 13. Since the Crossbar Network 23 is basically simple in its function of connecting as set (or programmed) any input thereof, the controlling mechanisms generally employed are both simple and varied. In telephone control offices for example, the desired connections are in essence "dialed up" by manual switches whereas in multiprocessing systems electronic switches replace manual ones and automatic or programmable control replaces manual control. The crossbar control unit 25 may, as desired, therefore follow either a dynamically variable microprogram, a fixed program or sequence of interconnections, or a manually operated pattern selection. The crossbar control unit 25 merely directs the crossbar network 23 in its function of interconnecting Mask Generator 11 with Priority Encoder 13. The function of the crossbar control unit 25 and the crossbar network 23 will be more fully understood through the presentation of two illustrative examples given below.

Figures 5A, 5B:
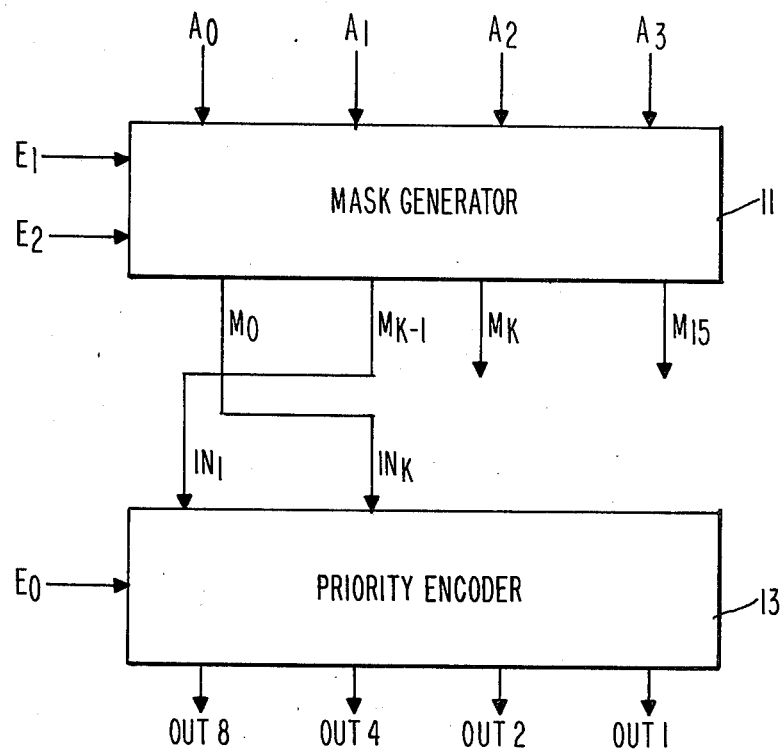
FIG. 5A is a diagram depicting the use of the present invention to derive the K complement of a number X.
FIG. 5B is a logic table depicting the function of the network of FIG. 5A.

A first example of the arithmetic use of the present invention involves the derivation of the integer K complement of an integer X. The K complement of the number X is given by (K-X). With reference to FIG. 5A and 5B, the number X in binary form addresses lines A0 through A3 of the Mask Generator 11 and the K complement (K-X) is ouputted from Priority Encoder 13 on output lines OUT1 through OUT8, for valves of K greater than X. The Mask Generator 11 inversely inputs the Priority Encoder 13. Thus, for example, if K were to equal 3, the output line M0 of Mask Generator 11 would be connected to IN3 line of the Priority Encoder 13. Inverse connections follow as the M1 line of the Mask Generator 11 is connected to the $IN_{K-1}$ line of Priority Encoder 13, and in general, the MN line of Mask Generator 11 is inputted to the input line $IN_{K-N}$ of Priority Encoder 13. The Priority Encoder 13 receives no inputs on input line IN0 and any input line labeled $IN_{K+1}$ or higher. The truth table for the K complement arrangement above-described, is given in FIG. 5B.

In FIG. 5A the Mask Generator 11 is shown as being hardwired to Priority Encoder 13 without the benefit of the crossbar network 23. Hardwiring may be implemented when a particular arrangement of the arithmetic apparatus of the present invention is required to do only a specific arithmetic function, such as the K complement.

Figure 6:
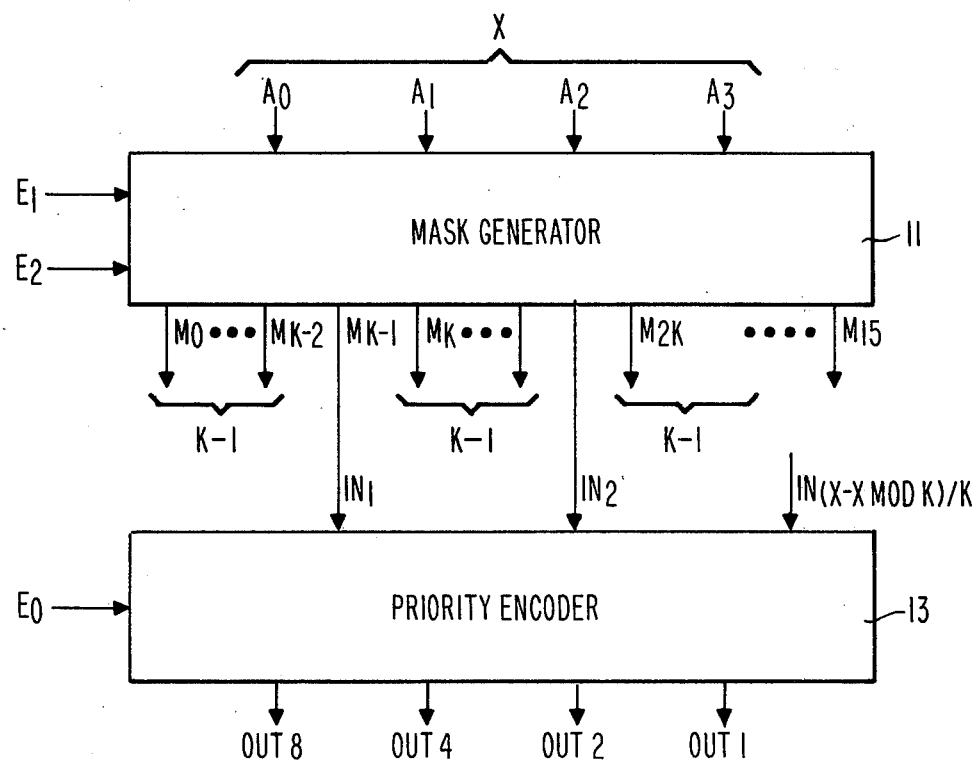
FIG. 6 is a block diagram illustrating the use of the arithmetic apparatus of the present invention to derive the quantity $(X - X_{mod\ K})$ divided by an integer K.

A second example illustrating the use of the arithmetic apparatus of the present invention involves the division of the quantity $(X-X_{Mod\ K})$ by an integer K. The apparatus employs the Mask Generator 11 and the Priority Encoder 13 interconnected as shown in FIG. 6. The Mask Generator 11 is addressed by the integer value X in binary form and the Priority Encoder 13 outputs in binary form the value $(X-X_{Mod\ K})/K$. As can be seen from the truth tables of FIG. 1B and FIG. 2B, the operative control values for this configuration are $E_0 = 1$, $E_1 = 1$, and $E_2 = 0$.

The Masking Output Line $M_{K-1}$ of Mask Generator 11 is connected to input line IN1 of Priority Encoder 13. The masking output line $M_{2K-1}$ is connected to the Priority Encoder 13 input line IN2. The pattern of connecting every $K^{th}$ output line of Masking Generator 11 to the input lines of Priority Encoder 13 is followed through to the Priority Encoder input line IN $(X-X_{MOD\ K})/K$; for the largest value of $(X-X_{MOD\ K})/K$ to be calculated.

The arithmetic apparatus of the present invention employing a Mask Generator 11 and a Priority Encoder 13 has been described using a crossbar network 23 and shown in two embodiments using hardwired interconnections. Between the complexity of a complete crossbar network interconnecting device and the simplicity of fixed hardwired applications, a variety of simple interconnecting devices may be employed such as would be apparent to one skilled in the art. For example, it has been shown that in deriving the K complement of a number or in dividing the number $(X-X_{MOD\ K})$ by K, the Mask Generator 11 and the Priority Encoder 13 are interconnected in rather simple fixed sequence which may be, of course, easily accomplished by apparatus less sophisticated than a full crossbar network.

Thus it will be appreciated that while only specific embodiments of the present invention and methods of practicing the same have been described and illustrated, changes and modifications therein will be apparent to one skilled in the art. The above description of the illustrated embodiments of the invention has been by way of example only and should not be taken as a limitation on the scope of the invention.

What is claimed is:

1. A high speed arithmetic apparatus for executing a selected arithmetic calculation upon a binary coded integer comprising:
   first means for receiving the binary coded integer and for outputting in parallel a tally coded representation thereof;
   second means for receiving in parallel a tally coded input and for outputting in parallel a binary coded representation thereof; and
   third means interconnecting the parallel output of said first means and the parallel input of said second means said third means for providing at the parallel output of said second means a binary coded resultant of the selected arithmetic calculation executed upon the binary coded integer received by said first means.

2. The apparatus of claim 1 wherein said third means includes:
   a crossbar network interposing said first means and said second means for interconnecting same; and
   a crossbar control unit directing said crossbar network in its interconnecting function, whereby the binary coded resultant of the selected arithmetic calculation executed upon the binary coded integer received by said first means is provided at the parallel output of said second means.

3. The high speed arithmetic apparatus according to claim 1 wherein said selected arithmetic calculation is Y equals $(X-X_{MOD\ K}) \div K$ wherein Y is the binary coded resultant provided at the parallel output of said second means, X is the binary coded integer received by said first means, K is a constant, and $X_{MOD\ K}$ equals X modulo K.

4. The high speed arithmetic apparatus according to claim 1 wherein said selected arithmetic calculation is Y equals $K-X$ for values of K greater than X wherein Y is the binary coded resultant provided at the parallel output of said second means, K is a constant and X is the binary coded integer received by said first means.

5. An arithmetic calculating apparatus comprising:
   first means having a plurality of input terminals for receiving a binary coded representation of an integer X and a plurality of output terminals ordered from a least significant terminal to a most significant terminal for outputting a tally coded representation of said integer X;
   second means having a plurality of input terminals ordered from a least significant terminal for receiving tally coded representations, said plurality of input terminals including at least $(X-X_{MOD\ K}) \div K$ terminals wherein K is an integer, said second means also having a plurality of output terminals for outputting binary coded representations of received tally coded representations; and
   means connecting every $K^{th}$ output terminal in said plurality of output terminals of said first means in ordered sequence to said plurality of input terminals of said second means from said least significant terminal to at least the $(X-X_{MOD\ K}) \div K^{th}$ terminal thereof.

6. An arithmetic calculating apparatus comprising:
   first means having a plurality of input terminals for receiving a binary coded parallel representation of an integer X and a plurality of output terminals ordered from a least significant terminal to a most significant terminal for outputting a tally coded parallel representation of said integer X;
   second means having a plurality of input terminals ordered from a least significant terminal to a most significant terminal for receiving tally coded parallel representations, said plurality of input terminals including at least K terminals, said second means also having a plurality of output terminals for outputting binary coded parallel representations of received tally coded parallel representations; and
   means connecting in inverse sequence all output terminals of said first means from said least significant terminal to the $K^{th}$ significant terminal thereof to the least K significant terminals in said plurality of input terminals of said second means.

* * * * *